H. L. GILSON.
CONNECTING AND TIGHTENING DEVICE FOR CHAINS AND THE LIKE.
APPLICATION FILED JUNE 24, 1915.
1,177,509.  Patented Mar. 28, 1916.
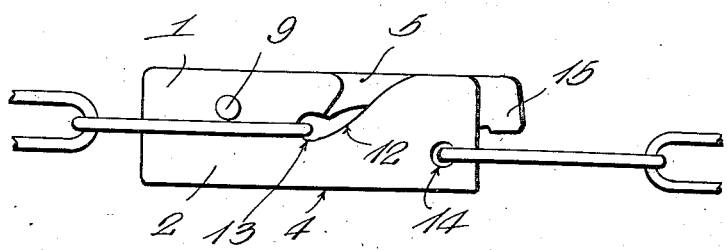
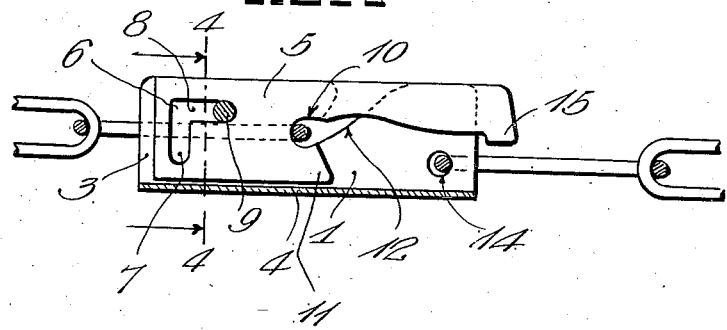
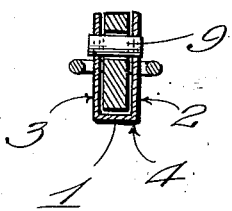
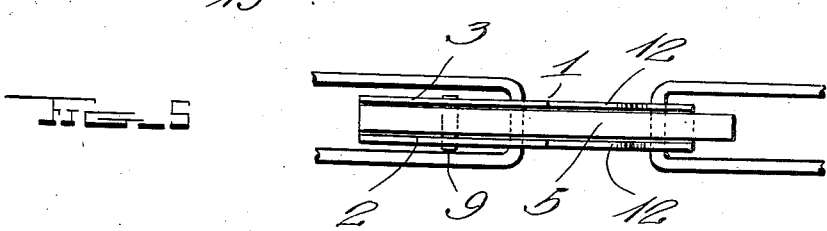
Witnesses
Inventor
Harvey L. Gilson
By
Attorneys

UNITED STATES PATENT OFFICE.

HARVEY L. GILSON, OF LONGMONT, COLORADO, ASSIGNOR OF ONE-HALF TO LANCE W. NEWBY, OF LONGMONT, COLORADO.

CONNECTING AND TIGHTENING DEVICE FOR CHAINS AND THE LIKE.

1,177,509.  Specification of Letters Patent.  Patented Mar. 28, 1916.

Application filed June 24, 1915. Serial No. 36,085.

*To all whom it may concern:*

Be it known that I, HARVEY L. GILSON, a citizen of the United States, residing at Longmont, in the county of Boulder and State of Colorado, have invented certain new and useful Improvements in Connecting and Tightening Devices for Chains and the like; and I do declare the following to be a full, clear, and exact description of the invention, such as will enable others skilled in the art to which it appertains to make and use the same.

This invention relates to improvements in connecting and tightening devices for chains, ropes and the like.

The object of the invention is to provide a device of this character so constructed as to particularly adapt it for connecting the ends of anti-skidding chains such as are used on the tires of motor vehicles.

Another object is to so construct a device of this character that it will take up all of the slack in the chain and cause it to snugly fit the tire to which it is applied.

Another object is to so construct a device of this character that the pull of the chain prevents the device from opening and accidentally releasing the chain links or the ends of the rope or cable with which it is connected.

With the above and other objects in view, the invention consists of certain novel features of construction, combination and arrangement of parts hereinafter described and claimed.

In the accompanying drawings: Figure 1 is a side elevation of a device constructed in accordance with this invention, showing it applied; Fig. 2 is a longitudinal section thereof; Fig. 3 is a similar view showing the securing lever in open position; Fig. 4 is a transverse section taken on the line 4—4 of Fig. 2; Fig. 5 is a top plan view thereof.

In the embodiment illustrated, a combined link connector and tightening device is shown in the form of a sheath 1 composed of two side members or plates 2 and 3 united at one edge by a strip 4 which is here shown integral with the side plates and whereby said plates are held a desired distance apart to provide for the reception between them of a tightening and securing lever 5, said sheath being substantially U-shaped in cross section, the strip 4 constituting the cross bar thereof. This lever is shown of a thickness slightly less than the distance between said plates 2 and 3 and is provided at one end with an L-shaped slot 6, one arm or portion 7 of which extends transversely of the bar or lever and the other arm 8 of said slot is arranged longitudinally adjacent one side edge thereof. A pivot or fulcrum pin 9 extends through registering apertures 9' in the side plates 2 and 3 and through this L-shaped slot 6 in the lever and connects the lever to the sheath. This L-shaped slot through which the lever is connected to the sheath provides for the longitudinal movement of said lever relatively to its fulcrum 9 and this movement is equal to the length of the longitudinally disposed arm 8 of the slot 6 to provide for the opening of the lever, it being necessary to move said lever forwardly a sufficient distance to bring the fulcrum 9 into register with the transversely extending arm 7 of the slot 6 before said lever can be swung outwardly owing to the fact that the end of the lever which contains this slot is of a width between the slot arm 8 and its inner edge substantially equal to the distance between the cross bar or strip 4 and the point in the plates 2 and 3 through which the fulcrum 9 passes, said strip 4 forming a stop ledge for the lever. Consequently, when the fulcrum 9 is engaged with the slot arm 8, said lever cannot swing outwardly as its lower edge closely engages the strip 4 which connects the plates 2 and 3. Hence, it is necessary that the arm 7 of the slot 6 be first brought into register with the fulcrum 9 to permit said lever to be moved laterally outward a sufficient distance to permit its inner edge or end to be moved away from stop 4 a sufficient distance to allow the lever to swing outwardly into the position shown in Fig. 3. This lever 5 has its inner edge recessed or cut away for a portion of its length beyond the slotted end thereof and is provided at the inner end of said recess with a forwardly opening notch 10 having a bill 11 at its outer side for a purpose to be described.

The side plates 2 and 3 of the sheath 1 have obliquely disposed slots 12 opening from the free edges thereof inward and terminating at their inner ends in registering eyes or notches 13. The walls of these slots 12 which incline outward toward the end of the sheath opposite to that which carries the fulcrum 9 of the lever are designed to assist in retaining the link or other member to be connected in the notches 13 formed at the inner ends of said slots before the lever is brought into closed position. These notches or eyes 13 are designed to register with the notch 10 in the lever 5 when said lever is in closed operative position and these three registering notches are designed to receive the free end or link of the chain or rope to be connected, it of course being understood that when a rope or cable is used, that a loop or link of some sort must be provided before connecting it by this device. This sheath 1 is provided at its front end or the end nearest the open end of the slots 12 with registering apertures 14 which extend transversely adjacent the connecting strip 4. These registering apertures are designed to receive one link or end of the chain or rope to be connected.

The lever 5 is shown of a length slightly greater than the length of the sheath 1 so that its free reduced end projects beyond the end of the sheath and is provided on its lower edge with a depending lug 15 which is designed to be engaged by a tool to facilitate the longitudinal movement of the lever in the sheath when it is desired to move it forward into releasing position and when so brought forward, this lever may be readily swung outward to permit the link or loop carried thereby to be disengaged or to provide a slack in the chain, it of course being understood that this lever is also thrown in this position to receive the end of the chain or rope to be connected.

In the use of this improved connector and tightening device, when the parts are in the position shown in Fig. 1 and it is desired to open the connector for connecting it with another link of the chain or for relieving the tension on the chain such as may be desired when the chain is to be removed from the vehicle tire, the lever is moved longitudinally forward until the transversely extending arm 7 of the slot 6 is brought into register with the fulcrum 9 and when in this position, the lever may be swung outwardly and rearwardly into the position shown in Fig. 3, thereby disengaging the link which it carries and permitting it to be removed and another substituted if desired. A link is then placed in the notch 10 of the lever 5 and said lever swung forwardly and downwardly between the plates 2 and 3 of the sheath and then slipped longitudinally rearward to bring the notches 10 and 13 into register, with the bill 11 disposed between the side plates 2 and 3 below said notches and when in this position, the link or loop of the element to be connected is disposed in said notches and the pull of said element tends to hold the lever reliably in locked position and prevent it from being accidentally moved forwardly and thereby releasing the device.

From the above description, it will be understood that when a link is placed in the notch 10 of the lever 5 and said lever swung forward into closed position within the sheath sufficient strain will be exerted on the chain to take up all or substantially all of the slack in the chain and cause it to fit snugly on the wheel.

From the above description, it will be obvious that this device while very simple in construction and cheap to manufacture, will be thoroughly effective for connecting and tightening up chains and the like and will be especially useful for connecting antiskidding chains on automobile wheels as it may be readily applied and removed which is an essential feature in devices of this character.

I claim:—

1. In a device of the class described, a body member having a stop, and a lever, one of said members having an L-shaped slot with one arm of the slot extending transversely and the other arm longitudinally of said member, the other member having a pin extending through said slot to provide for longitudinal and rotary movement of one member relatively to the other, and whereby said lever is locked by said stop against rotary movement when shifted longitudinally in one direction and released when shifted longitudinally in the opposite direction.

2. A connector and tightener for chains and the like comprising a plate having a lateral extension at one edge, a lever having an L-shaped slot in one end, a fulcrum extending through said plate and the slot in said lever, one arm of said slot extending transversely of the lever and the other arm extending longitudinally thereof, the end of said lever containing said slot being of a width between the longitudinal slot arm and the inner edge of the lever substantially equal to the distance between the lateral extension of said plate and the lever fulcrum whereby said lever is locked against rotary movement through the engagement of its fulcrum with the longitudinally disposed arm of the slot and released when the fulcrum engages the transverse arm of said slot, said lever and plate having registering notches to receive one end of an element to be held when the lever is in closed position.

3. A connecting and tightening device comprising a sheath, a lever disposed in said sheath, one of said members having an L-shaped slot therein with one arm of the slot extending transversely and the other longitudinally of said member, and the other member having a fulcrum extending through said slot whereby longitudinal and rotary movement of one member relatively to the other is provided for, the movable member being held against rotary movement when shifted longitudinally in one direction and released when moved longitudinally a predetermined distance in the opposite direction, said members having registering notches to receive one end of an element to be connected when the members are in closed position.

In testimony whereof I have hereunto set my hand in presence of two subscribing witnesses.

HARVEY L. GILSON.

Witnesses:
BENJAMIN F. SMITH,
HUGH BYRNE.